United States Patent [19]

Judex

[11] Patent Number: 4,778,079
[45] Date of Patent: Oct. 18, 1988

[54] METHOD AND APPARATUS FOR SELECTIVELY CONTROLLING THE DIVIDED DISCHARGE OF A PASTE SUBSTANCE FROM THE CAVITIES IN A DISPENSING CARRIER

[75] Inventor: Helmut Judex, Schwieberdingen, Fed. Rep. of Germany

[73] Assignee: Werner & Pfleiderer GmbH, Stuttgart, Fed. Rep. of Germany

[21] Appl. No.: 895,897

[22] Filed: Aug. 12, 1986

[30] Foreign Application Priority Data

Aug. 28, 1985 [DE] Fed. Rep. of Germany ....... 3530724

[51] Int. Cl.<sup>4</sup> .............................................. G01F 11/10
[52] U.S. Cl. ......................................... 222/1; 222/147; 222/153; 222/218; 222/221; 222/266; 222/368; 141/243; 141/259; 141/367
[58] Field of Search ............... 222/147, 153, 216, 217, 222/218, 221, 249, 250, 251, 254, 266, 267, 268, 275, 278, 305, 306, 309, 343, 363, 368, 1; 141/100, 102, 237, 242, 243, 258, 259, 260, 261, 262, 367, 9; 221/154, 224, 225, 233, 234, 263, 266

[56] References Cited

U.S. PATENT DOCUMENTS

| 1,763,487 | 6/1930 | Taylor | 222/363 X |
| 2,684,186 | 7/1954 | Mattos | 222/218 |
| 2,727,657 | 12/1955 | Bagby | 141/242 X |
| 3,353,722 | 11/1967 | Mehta | 222/218 |
| 4,634,026 | 1/1987 | Suay Puig et al. | 222/218 |

FOREIGN PATENT DOCUMENTS

| 1386118 | 12/1964 | France | 222/368 |
| 2748959 | 5/1979 | Fed. Rep. of Germany | 222/218 |
| 0606569 | 4/1978 | U.S.S.R. | 222/218 |

*Primary Examiner*—Joseph J. Rolla
*Assistant Examiner*—Edward S. Ammeen
*Attorney, Agent, or Firm*—Roberts, Spiecens & Cohen

[57] ABSTRACT

A method and apparatus of controlling the dividing of a paste composition from the dispensing cavities in a carrier in which floatable pistons in the cavities regulate the amount of paste composition which is discharged from the respective dispensing cavities. The stroke of each piston in its respective cavity is controlled in an operative state to regulate the amount of paste composition discharged from each cavity and each piston is selectively locked in its respective cavity in an inoperative state to prevent discharge of paste composition from the respective cavity. The selective locking of the piston in its inoperative state or keeping the piston in its operative state is effected by angularly positioning the piston in a selective first position in which a locking bar rides in a first cutout in the piston and the piston is in operative state and can undergo axial travel through its controlled stroke in its respective cavity and a second position in which the locking bar is engaged in a second cutout in the piston and the piston is in inoperative state and locked against axial travel in its respective cavity.

18 Claims, 1 Drawing Sheet

METHOD AND APPARATUS FOR SELECTIVELY CONTROLLING THE DIVIDED DISCHARGE OF A PASTE SUBSTANCE FROM THE CAVITIES IN A DISPENSING CARRIER

FIELD OF THE INVENTION

The invention relates to a method and apparatus for selectively controlling the divided discharge of a paste substance from the cavities in a dispensing carrier.

The paste substance which is controlled can be any material in plastic state which is able to be discharged under pressure through a cavity and, by way of example, can be dough.

The invention particularly relates to a paste dividing apparatus having a carrier with a plurality of dispensing cavities in which floatable pistons are supported for controlling the output of the paste from the carrier and wherein in order to deactivate one or more of the cavities the respective piston or pistons are locked in the respective cavities.

DESCRIPTION OF PRIOR ART

A paste dividing apparatus is known in which a carrier having a row of spaced, adjacent dispensing cavities normally produces a plurality of strings of paste equal to the number of dispensing cavities in said row. Therefore, if, for example, six dispensing cavities are arranged in a row, six paste strings will be dispensed. In some cases, the full capacity of the dispensing apparatus may not be required. It may be sufficient, for example, to produce only five, or even only four paste strings. This requirement could be met by replacing the carrier with another one, which has a lesser number of dispensing cavities. This type of replacement requires a considerable amount of work and also the production of interchangeable parts.

Consequently, it has been proposed to employ a carrier with the maximum number of cavities expected to be used, for example, six and to deactivate one or more of the cavities according to need.

In one known arrangement, this is accomplished by removing the measuring piston from the dispensing cavity which is to be deactivated and inserting a dummy plug instead which is held in position by a locking device. Although this arrangement requires a fair amount of labor and material expense, the cost is considerably less than the complete replacement of a carrier.

In another arrangement disclosed in DE-OS No. 1,632,357, a dispensing cavity is deactivated, not by removing the piston from the dispensing cavity in exchange for a dummy plug, but by keeping the measuring piston in the dispensing cavity and locking it in a position level flush with the front or inlet face of the carrier. For this purpose, each of the pistons has a specially designed, threaded piston rod, enabling the piston to be clamped against the carrier or its shaft. Although this known paste dispensing apparatus does not require any special attachments for plugging the openings of the dispensing cavities, the labor involved to secure each of the threaded piston rods of the pistons that are to be deactivated, is time consuming and can be accomplished only with special tools due to the constructional necessity of securing the rods inside the dispensing cavities. In any event, this type of locking cannot be used with floating pistons, because of the absence of piston rods.

SUMMARY OF THE INVENTION

An object of the invention is to provide a method and apparatus for deactivating one or more of the dispensing cavities which is simple in construction and operation.

In accordance with one aspect of the invention a floating piston is disposed in each cavity of the dispensing carrier for controlling the admission of a measured quantity of paste into the cavity and its subsequent discharge therefrom, the carrier being movable between a supply position in which paste can be fed into the dispensing cavities from a paste outlet and a dispensing position in which the paste in the dispensing cavities can be externally discharged therefrom by the pistons; and means are provided for selectively locking the pistons in their respective dispensing cavities for selectively rendering the cavities inoperative for the admission and dispensing of paste.

In further accordance with the invention, the aforesaid means comprises a stop bar disposed adjacent the dispensing cavities and attachment means connecting the stop bar to the carrier for adjustment such that the stop bar can selectively penetrate into said dispensing cavities or be selectively withdrawn therefrom. The floating piston in each cavity is provided with first and second cutouts spaced circumferentially on the piston and each piston is rotatable in its respective cavity for the selective engagement of the stop bar in the cutouts. The first cutout extends axially of the piston to define a length of stroke for the piston, in operative state, when the stop bar is engaged in the first cutout, the second cutout being of restricted length axially of the piston so that with the stop bar engaged in the second cutout the piston is in inoperative state and is prevented from moving axially in its dispensing cavity.

The above construction provides the advantage that by the use of a single stop bar, the pistons can be rendered operative or inoperative individually.

In accordance with a feature of the invention, if the cutouts are disposed in diametrically opposed relation at the periphery of the piston, then the operative and inoperative states of the piston can be obtained by rotating the piston 180° in its respective cavity.

The formation of the pistons with their first and second cutouts is obtained in simple manner when the pistons are cylindrical and the cutouts are formed at the periphery of the piston by making the first cutout as a flatted sector and the second cutout as a tangential groove. The positions of the cutouts does not have to be extremely accurate as a precise index position can be achieved automatically by the attachment of the locking bar to the carrier.

By making the locking bar extend the entire length of the carrier so that the locking bar can be employed to selectively lock any piston in its respective cavity, the construction is greatly simplified as it requires one adjustment for the release and engagement of the locking bar with each of the pistons.

According to a further feature of the invention, the locking bar is constructed as an angle member and the attachment means is externally accessible so that the locking bar can be easily manipulated between locked and unlocked states.

In a further feature of the invention, the locking bar is biased to its release position from the cutouts of the pistons when knurled adjusting nuts are loosened.

The invention is also directed to the method aspects of controlling the dividing of the paste composition from the dispensing cavities in the carrier and particularly to the method comprising controlling the stroke of each piston in its respective cavity in an operative state to regulate the amount of paste composition discharged from each cavity and selectively locking each piston in its respective cavity in an inoperative state to prevent discharge of paste composition from the respective cavity, the selective locking of the piston in its inoperative state or keeping the piston in its operative state being effected by angularly positioning the piston in a selective first position in which the piston 6 is in operative state and can undergo axial travel through its controlled stroke in its respective cavity 5 and a second position in which the piston 6 is in inoperative state and locked against axial travel in its respective cavity.

DETAILED DESCRIPTION OF A PREFERRED EMBODIMENT

Figure 1:
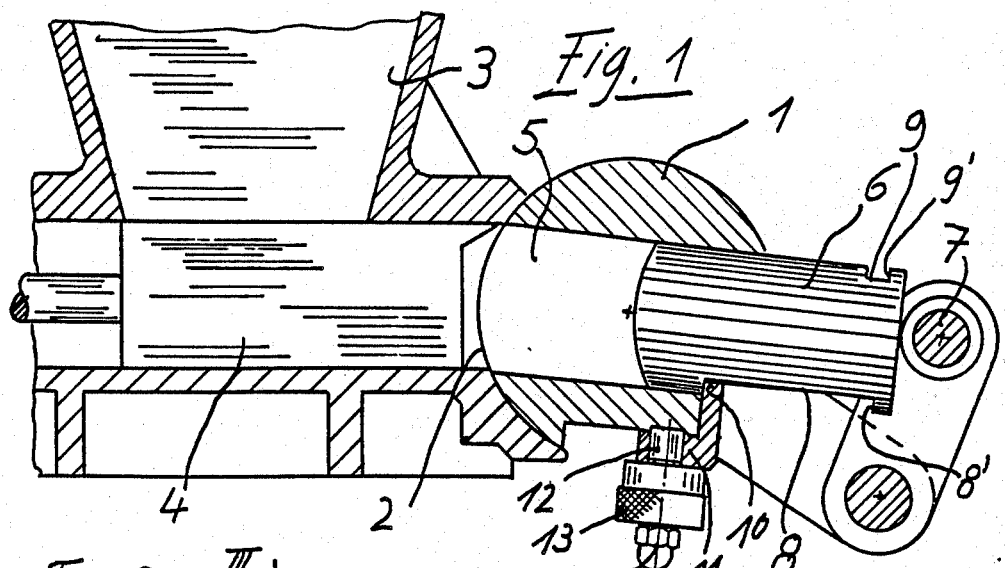
FIG. 1 is a vertical section taken through a paste dividing apparatus showing the improvement according to the invention.

Referring to the drawing, herein is seen apparatus for dividing a paste composition which comprises a rotatable carrier 1 for dispensing paste positioned opposite an outlet 2 of a paste supply means comprising a paste funnel 3 and a paste delivery piston 4 beneath funnel 3. The piston 4 is reciprocably movable in a cylindrical chamber located under the paste funnel 3. The paste is suctioned out of the paste funnel 3 during a back stroke of the delivery piston 4 and the paste is forced into dispensing cavities 5 provided in the carrier 1 during a forward stroke of the delivery piston 4.

The dispensing cavities 5 are located side by side in a row in the carrier 1. Each of the cavities has a cylindrical cross-ection and slidably accommodates a floating measuring piston 6. When the piston is in operative state in its cavity, it is movable between a retracted inner position (shown in solid lines in FIG. 3) and an extended outer position as shown in solid lines in FIG. 1. The outer or rear face of the piston bears against a roller bearing on a rod 7 which is pivotably connected at its ends by linkages to the carrier 1. After the dispensing cavities 5 have been filled with paste due to the forward stroke of piston 4, the carrier 1 is turned 90° counterclockwise so that the openings of the dispensing cavities 5 now face downwardly. The rod 7 is actuated by a power mechanism (not shown) such as a hydraulic cylinder to displace the measuring pistons 6 in their cavities to push out the paste. As a consequence, strings of paste are discharged from the cavities 5 in a number equal to the number of cavities and operating pistons 6. After the pistons have been displaced to their inner positions and the paste has been discharged, the carrier is turned back 90° to its feed position. In the feed position the rod 7 yieldably holds the pistons in their inner positions under the action of the power mechanism. The rod 7 serves as a rear stop for the extended position of the pistons as well as a means for adjustment of the stroke of the measuring pistons 6 and, consequently, for varying the volume of the paste dispensed. The measuring pistons 6 which are cylindrical, each has a first cutout 8 formed as a flatted segment at the periphery of the piston extending axially a length equal to the longest possible stroke of the piston. In diametric opposition to the first cutout 8 in each piston is a second cutout 9 formed by a tangential groove at the periphery of the piston. The cutouts 8 and 9 have respective rearward bounding edges 8', 9' which lie in the same radial plane.

Figure 2:
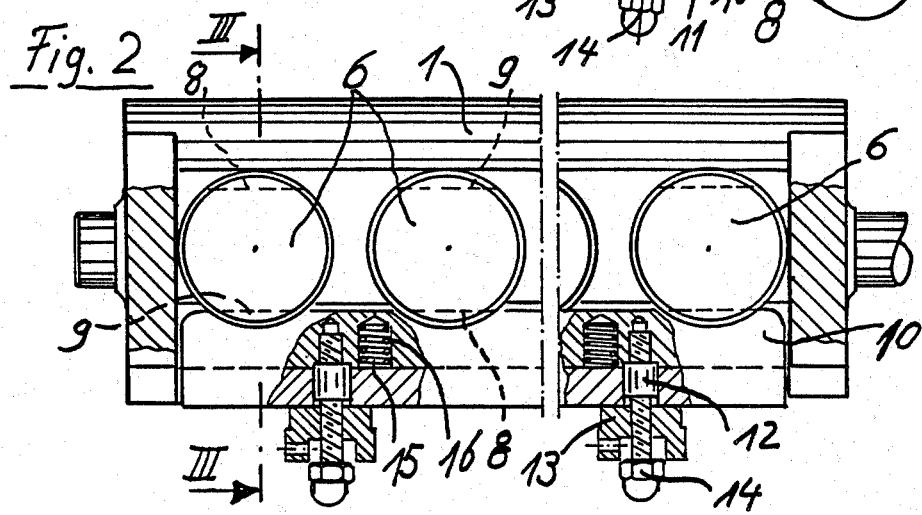
FIG. 2 is an elevational view from the right side of FIG. 1, partially in section, and broken in length.
Figure 3:
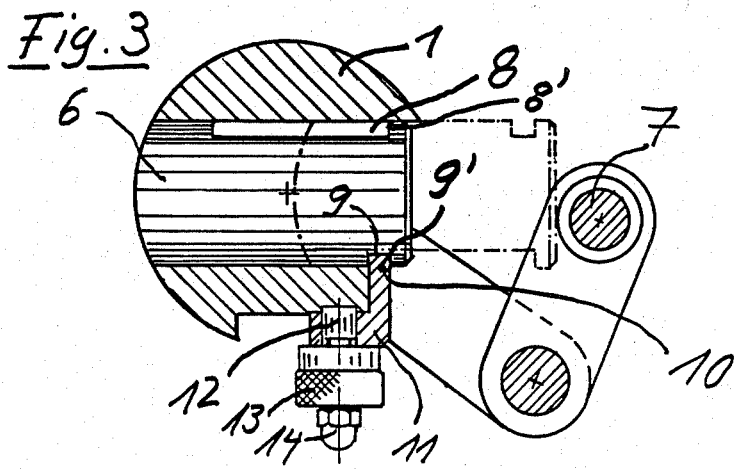
FIG. 3 is a section taken on line III—III in FIG. 2.

The cutouts 8 and 9 in each piston are selectively engageable with a positive stop means in the form of an angle member having a vertical leg 10 and a horizontal leg 11. The angle member is mounted on the carrier 1 by leg 11 and leg 10 extends along the length of carrier 1 adjacent all of the cavities 5. In an engaged position as shown in FIGS. 1–3, the upper edge of leg 10 projects into the cavities 5 in the carrier 1 by an amount equal to the depth of the first and second cutouts 8 and 9 in the measuring pistons 6. If the leg 10 is positioned in the cutout 8 of a measuring piston 6, the piston can move through its maximum stroke. When the bounding edge 8' rests against leg 10, the curved front face of the measuring piston 6 is flush and continuous with the front face of the carrier 1, and prevents the measuring piston from projecting outside the contour of the carrier when the paste is discharged. When the leg 10 is inserted into the second recess 9 of a measuring piston 6, this piston becomes locked in an inoperative state in which its front face is flush and continuous with the outer surface of carrier 1 whereby the piston is positively deactivated. The angle member is attached to the carrier 1 through leg 11 which is fastened to the underside of the carrier 1 by attachment means which enables the leg 10 to project a uniform depth into cavities 5. The attachment means comprises vertically disposed threaded studs 12 anchored in the carrier 1 at spaced locations along the carrier. A knurled nut 13 is threaded on the external portions of the studs 12 and the nuts 13 are prevented from becoming separated from the studs by castle nuts 14 secured on the ends of the studs. The nuts 13 are adjustable on studs 12 between a lowered position engaging nuts 14 and an upper position in which the leg 11 abuts against the underside of carrier 1 and leg 10 fully penetrates into one of the cutouts. In the lowered position of nuts 13, the leg 10 is withdrawn from the cavities 5 and from the cutouts in the pistons. The underside of the carrier 1 is provided with blind holes 16 which receive compression springs 15, which act to urge the leg 10 of the angle member out of the cutouts. Hence, when the knurled nuts 13 are lowered on studs 12, the springs 15 will cause the angle member to follow suit. Fixedly mounted on nuts 12 are sleeves 17 which slidably guide the leg 11 of the angle member in its movement.

In operation, in order to proceed from a condition in which all of the dispensing cavities 5 are operative to a condition in which the extreme left dispensing cavity 5, as shown in FIG. 2, is to be deactivated, the threaded nuts 13 are lowered on studs 12 until the nuts 13 contact castle nuts 14. The compression springs 15 displace the leg 11 of the angle member away from the underside of the carrier 1 to remove leg 10 from the cutouts 8 of the measuring pistons 6. During this operation, the leg 11 of the angle member is safely guided by the sleeves 17 and leg 10 will not jam. The measuring piston 6 which is to be deactivated is rotated 180° around its axis and its front face is aligned with the front face of the carrier 1. The knurled nuts 13 are then tightened making certain that the leg 10 of the angle member is inserted into the second cutout 9 of the measuring piston 6 to be deactivated as shown in FIG. 3. All of the foregoing adjustments can be made by hand, simply without the use of tools.

During the operation, the deactivated piston 6 remains locked in its cavity and, as seen in FIG. 3 in chain dotted outline, the adjacent operating measuring piston is shown in extended position bearing against the bearing on rod 7.

Instead of the carrier 1 being cylindrical to explain the invention, the carrier could consist of vertically moving slides or sliding cavities opposite the paste outlet.

Although the invention has been described in relation to specific embodiments of the invention, it will become apparent to those skilled in the art that numerous modifications and variations can be made within the spirit and scope of the invention as defined by the attached claims.

What is claimed is:

1. In a machine for dividing a paste mass into separate feed quantities comprising a carrier adjacent an outlet of a supply of paste, the carrier having a plurality of dispensing cavities disposed in spaced, adjacent relation in a row facing said outlet for communicating therewith, and a floating piston in each said cavity for controlling the admission of a measured quantity of paste into the cavity and its subsequent discharge therefrom, the carrier being movable between a supply position in which paste can be fed into the dispensing cavities from said paste outlet and a dispensing position in which the paste in the dispensing cavities can be externally discharged therefrom by the pistons, the improvement comprising means for selectively locking the pistons in their respective dispensing cavities for selectively rendering the cavities inoperative for the admission and dispensing of paste, said means comprising a stop bar disposed adjacent the dispensing cavities, attachment means connecting the stop bar to the carrier for adjustment such that the stop bar can selectively penetrate into said dispensing cavities or be selectively withdrawn therefrom, the floating piston in each cavity being provided with first and second cutouts spaced circumferentially on said piston, each piston being rotatable in its respective cavity for the selective engagement of said stop bar in said cutouts, the first cutout extending axially of the piston to define a length of stroke for the piston in operative state when the stop bar is engaged in said first cutout, the second cutout being of restricted length axially of the piston so that with the stop bar engaged in said second cutout the piston is in inoperative state and prevented from moving axially in its dispensing cavity.

2. The improvement as claimed in claim 1 wherein said first and second cutouts have respective bounding edges disposed in a common plane.

3. The improvement as claimed in claim 2 wherein said bounding edges are located in said piston such that when said stop bar engages said bounding edges, said piston blocks entry of paste into said dispensing cavity.

4. The improvement as claimed in claim 3 wherein said carrier has a rounded contour and each piston has an end with a curved surface which is flush and continuous with the rounded contour of said carrier when the respective piston is engaged with either of said bounding edges of said cutouts.

5. The improvement as claimed in claim 4 wherein said common plane containing said bounding edges extends perpendicularly to the axis of the piston.

6. The improvement as claimed in claim 1 wherein said cutouts are diametrically opposed in the respective piston.

7. The improvement as claimed in claim 1 wherein said first cutout is formed by removal of a flatted segment at the periphery of the piston.

8. The improvement as claimed in claim 1 wherein said second cutout is a groove formed at the periphery of the piston and extending transversely thereof.

9. The improvement as claimed in claim 1 wherein said bar extends along the length of the carrier for projecting into all of the cavities in said carrier.

10. The improvement as claimed in claim 9 wherein said bar is of angle cross-section including one leg connected by said attachment means to said carrier and a second leg positioned to project into said cavities.

11. The improvement as claimed in claim 10 wherein said attachment means comprises threaded studs anchored in said carrier and supporting said bar for adjustment thereon to control the penetration of the second leg into to said dispensing cavities.

12. The improvement as claimed in claim 11 wherein said attachment means further comprises nuts threaded on said studs and engaging said one leg of the bar to adjust the penetration of said second leg into said cavities.

13. The improvement as claimed in claim 12 comprising retainer means on said studs for preventing separation of said nuts therefrom.

14. The improvement as claimed in claim 11 comprising spring means acting between said carrier and said bar for urging said bar in a direction to withdraw said second leg from said cavities.

15. A method of controlling the discharge of a paste composition from the dispensing cavities in a carrier in which floatable pistons in the cavities regulate the amount of paste composition which is discharged from the respective dispensing cavities, said method comprising producing a stroke of each piston in its respective cavity in an operative state to discharge an amount of paste composition from each cavity and selectively locking each piston in its respective cavity in an inoperative state to prevent discharge of paste composition from the respective cavity during each stroke while being prevented from rotating by a locking bar, each piston being angularly turnable about its own axis in its respective cavity, the selective locking of the piston in its inoperative state or keeping the piston in its operative state being effected by angularly turning the piston around its own axis between a selective first angular position in its respective cavity in which the piston is in operative state and can undergo axial travel through its stroke in said respective cavity and a second angular position in its respective cavity in which the piston is angularly offset in its respective cavity relative to said first angular position and is in inoperative state and is locked by said locking bar against axial travel in said respective cavity.

16. A method as claimed in claim 15 wherein said piston is turned through an angle in traveling between said first and second positions.

17. A method as claimed in claim 16 wherein in each of said positions said piston engages said locking bar which is attached to the carrier.

18. A method as claimed in claim 17 comprising disengaging said locking bar from said piston to enable the piston to be turned between said positions.

* * * * *